United States Patent [19]
Loercks et al.

[11] Patent Number: 5,897,944
[45] Date of Patent: Apr. 27, 1999

[54] MOLDED PART MADE OF STARCH FOAMED MATERIAL

[75] Inventors: Juergen Loercks, Rees; Winfried Pommeranz; Harald Schmidt, both of Enger, all of Germany

[73] Assignee: Bio-Tec Biologische Naturverpackungen GmbH, Emmerich, Germany

[21] Appl. No.: 08/793,970

[22] PCT Filed: Sep. 5, 1995

[86] PCT No.: PCT/EP95/03486

§ 371 Date: Mar. 6, 1997

§ 102(e) Date: Mar. 6, 1997

[87] PCT Pub. No.: WO96/07693

PCT Pub. Date: Mar. 14, 1996

[30] Foreign Application Priority Data

Sep. 6, 1994 [DE] Germany ............................ 44 31 777

[51] Int. Cl.⁶ .................. B32B 5/18; B32B 7/10; B32B 31/10; C09J 5/02
[52] U.S. Cl. ................. 428/316.6; 156/77; 156/296; 156/308.6; 264/53; 264/126; 264/162; 428/317.7; 428/376; 428/398; 428/399; 428/401
[58] Field of Search ................... 428/304.4, 313.5, 428/317.7, 316.6, 317.5, 376, 398, 399, 401; 427/195; 264/6, 45.7, 46.5, 118, 119, 126, 504, 53, 162; 156/77, 296, 308.6

[56] References Cited

U.S. PATENT DOCUMENTS

| | | |
|---|---|---|
| 5,186,990 | 2/1993 | Starcevich . |
| 5,252,271 | 10/1993 | Jeffs ............................................ 264/54 |
| 5,279,658 | 1/1994 | Aung .................................... 106/154.1 |
| 5,413,855 | 5/1995 | Kolaska et al. ....................... 428/320.2 |

FOREIGN PATENT DOCUMENTS

| | | |
|---|---|---|
| 2432700 | 1/1975 | Germany . |
| 4236717 | 1/1994 | Germany . |
| 4228779 | 3/1994 | Germany . |

OTHER PUBLICATIONS

Dr. Wiedmann: "Thermoplastische Stärke mit Doppel–schneckenextrudern herstellen". In: Kunststoffe 84, Aug. 1994, vol. 8, pp. 972–976.

Primary Examiner—Blaine R. Copenheaver
Attorney, Agent, or Firm—Venable; George H. Spencer; Catherine M. Voorhees

[57] ABSTRACT

The invention relates to a molded part made of completely biodegradable starch foamed material to be used for protecting transported articles and to a method for its preparation, wherein the starch foamed material is expanded to form starch foam profiled sections which are self-adhesive when moisture is applied and can be processed individually or so as to form single or multi-layer foam panels. The advantages reside in improved operating properties and minimized expenditure on packaging.

16 Claims, 1 Drawing Sheet

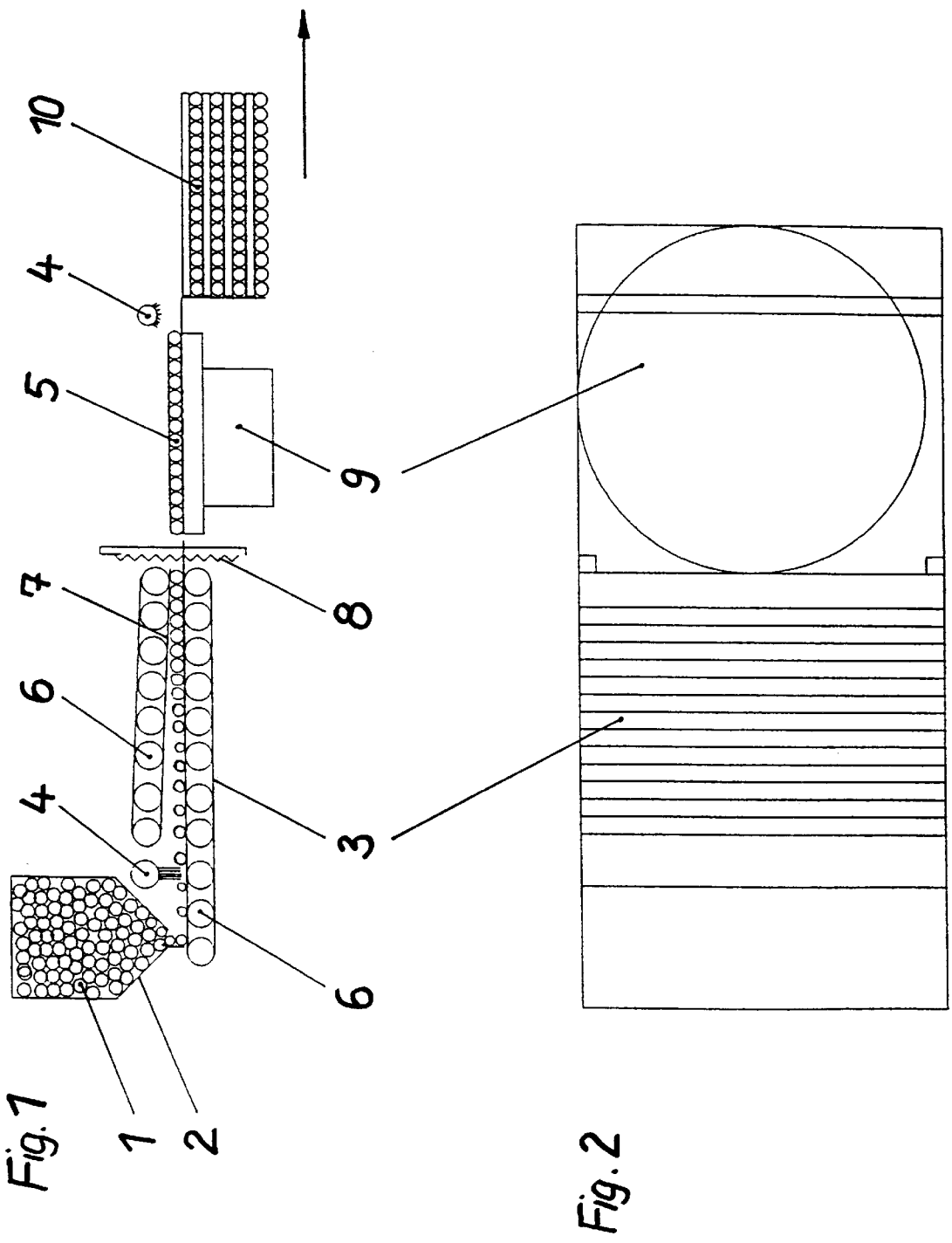

MOLDED PART MADE OF STARCH FOAMED MATERIAL

BACKGROUND OF THE INVENTION

The invention relates to a molded part made of starch foamed material to be used for protecting transported articles and to a method for preparing the same.

For instance, molded foams made of plastics (e.g. EPS) and/or molded parts made of cardboard, corrugated board and fibrous castings are known for protecting transported articles and for the packaging of extremely delicate transported articles such as glass articles or electronical articles. Many of these packaging materials are recyclable only at great cost since they do not consist entirely of biodegradable materials. Moreover, many of these packaging materials surround the respective transported article completely. Thus, due to the limited packaging methods, extremely delicate parts of transported articles can often be protected only insufficiently or less sensitive parts are packaged with the same cost as the most sensitive part of the respective transported article. In this case, the packaging cost is extremely high.

"Kunststoffe" 84 (1994), volume 8, pages 972 to 976 discloses possibilities for the processing of starch, for example for the application in the packaging sector. Moreover, factors influencing the properties of thermoplastic starch are examined. U.S. Pat. No. 5,186,990 discloses a method for preparing a biodegradable packaging material, for example a corner protector, as well as further molded articles. DE-A-24 32 700 discloses a method for preparing an essentially flat, rigid structure consisting of foamed articles made of polyurethane which are bonded by means of a plastic material which, in its liquefied state, is poured into spaces formed by sloping faces.

SUMMARY OF THE INVENTION

It is an object of the invention to provide biodegradable molded parts made of foamed profiled sections which have an essentially improved stability with respect to mechanical influences, and can be used for protecting transported articles and wherein the packaging requirements are minimized.

This object is achieved to according to the invention by a packaging material or a molded part made of biodegradable starch foamed material where the starch foamed material is expanded to form starch foam profiled sections which are self-adhesive when moisture is applied, and the starch foam profiled sections are bonded together to form panels.

The molded part, according to the invention, can be prepared by extruding starch foam, molding the same to form starch foam profiled sections, and bonding the starch foam profiled sections to form panels.

To achieve the object, the invention is based on the concept of preparing starch foam as a profiled section in the form of a solid or hollow profiled section with rounded or angular cross-sections in an extrusion process. These elastic starch foam profiled sections which an have a diameter of 10 to 50 mm and a specific weight of 10 to 100 kg/m$^3$, depending on the requirements, are prepared in different lengths, and the transported article to be protected is wrapped with these elastic starch foam profiled sections especially on delicate and exposed parts. The adhesion of the starch foam profiled sections on the transported article is facilitated since the starch foam becomes self-adhesive when some moisture is applied and can thus be bonded both with the transported article and with each other. This ensures a very good shock absorption effect for especially delicate parts of the transported article and a suitable application of the starch foam profiled sections as a protector for transported articles.

Furthermore, the starch foam profiled sections can, by the application of moisture, be combined to form panels. These panels can be processed to form stable duplex, triplex or multiplex foam panels, especially by changing the longitudinal direction of the starch foam profiled sections. Such thick-walled multiplex starch foam panels can fulfil multiple purposes as a protector for transported articles, a protector for the packaging, an insulating material against low temperatures and heat as well as for sound and shock absorption.

Moreover, the multiplex starch foam panels can be processed mechanically or thermally, for example by sawing, milling, cutting, stamping, drilling, grinding or trimming in order to prepare molded parts which can be used for protecting transported articles.

BRIEF DESCRIPTION OF THE DRAWINGS

In the following, the invention is explained in more detail in connection with the drawings in which:

FIG. 1: illustrates the principle method for the preparation of molded articles according to the invention, FIG. 2: is a top view of FIG. 1.

DETAILED DESCRIPTION OF THE INVENTION

According to the invention, starch foam is prepared in an extrusion process and extruded in any desired form as a starch foam profiled section 1. According to the first embodiment of the invention, these starch foam profiled sections 1 form molded parts which can directly be used for protecting transported articles. For this, the starch foam profiled sections 1 are moistened with water and brought in direct contact with the part of the transported article to be protected. The moistening activates the adhesiveness of the starch foam profiled sections 1, so that they adhere both to the transported article and to each other. Such an application is especially advantageous in case of transported goods having only separate delicate parts. Preferably, the starch foam profiled sections have the form of a rod and have a diameter of 10 to 50 mm and a specific weight of 10 to 100 kg/m$^3$. The starch foam profiled sections 1 can be solid or hollow and have rounded or angular cross-sections.

FIGS. 1 and 2 show a further embodiment of the invention. In a facility, panels 5 are prepared from elastic starch foam profiled sections 1 and processed to form multiplex foam panels 10 from which molded parts for multiple applications can subsequently be prepared by means of suitable mechanical processing. Elastic and, according to the present embodiment, rod-like starch foam profiled sections 1 are first prepared in an extrusion process and then stored in a magazine 2. The starch foam profiled sections 1 are dispensed from the magazine 2 in equal amounts and are supplied to a conveyor belt 3. The starch foam profiled sections 1 are conveyed by the conveyor belt 3 to a spraying device 4 which moistens their outer surfaces, preferably with water. In the course of the further processing, the starch foam profiled sections 1 are bonded by means of a further transportation belt 7 which is guided via rollers and arranged horizontally above the conveyor belt 3. Both belts 3 and 7 gradually approach each other up to a predetermined distance and form a wedge-shaped space which narrows in the conveying direction of the starch foam profiled sections 1. Between the belts 3 and 7, which move at the same speed in the direction of the narrow section, the moistened starch foam profiled sections 1 are brought in close contact so that they bond firmly together, and they emerge between the ends of the belts 3 and 7 as a panel 5. Immediately after that, the panels 5 are cut to a desired size by means of a separating means 8. The finished panels 5 reach a turntable 9 which rotates subsequent panels 5 by e.g. 90° in order to change the longitudinal direction of the starch foam profiled sections 1. It is also possible to rearrange or exchange the dies of the extruder arrangement so that the extruded starch foam profiled sections 1 can be bonded to form panels in a changed position or shape. Thus, the longitudinal direction of the starch foam profiled sections 1 of each subsequent panel 5 can be changed; therefore, the panels 5 do not have to be rotated. After the cutting operation and optionally rotating, the panels 5 are pushed from the turntable 9 by means of suitable transportation means, again moistened, placed one above the other so that they bond together and then optionally cut to a desired shape. The bonding together of the individual panels 5 can suitably be accelerated by a short application of pressure. Multiplex panels 10 which are prepared in this way can have any desired amount of layers of panels 5, their elasticity being variable. The different longitudinal directions of the starch foam profiled sections 1 of sandwiched panels 5 ensures the stability of the multiplex panels 10. Suitably, the properties of the multiplex panels 10 depend on the future purpose, i.e. as a protector for transported articles, a protector for the packaging, an insulating material against cold and heat as well as for sound and shock absorption, a filler for sandwich elements and laminates, a protector for the packaging of electronic and electric articles, which protector does not charge up electrostatically or as structural products for the construction, electrical, furniture, automobile and packaging industry. When the multiplex panel 10 is, for example, used as a protector for the packaging of extremely delicate transported articles such as glass articles, a cutout which has the shape of the transported article and which surrounds it can be milled or stamped into the multiplex panel 10.

According to a further embodiment of the invention, it is possible to moisten individual panels 5 made of starch foam profiled sections 1 and to bring them into contact with the transported article or to wrap extremely delicate parts with them. In this case, too, the adhesiveness of the starch ensures a safe bonding. In this case, the method steps following the cutting operation in the separating means 8 are not necessary.

We claim:

1. A molded part made of completely biodegradable starch foamed material, said molded part comprising: starch foam profiled sections formed of an expanded starch foam material, said starch foam profiled sections being rendered self-adhesive by moisture to form moistened starch foam profiled sections, wherein a plurality of said moistened starch foam profiled sections are bonded together to form a panel and a plurality of panels are stacked and bonded to each other to form a multiplex panel.

2. The molded part according to claim 1, wherein the starch foam profiled sections are solid or hollow and have rounded or angular cross-sections.

3. The molded part according to claim 1, wherein the starch foam profiled sections have a diameter of 10 to 50 mm and a specific weight of 10 to 100 kg/m$^3$.

4. The molded part according to claim 1, wherein the starch foam profiled sections are elastically deformable.

5. The molded part according to claim 1, wherein the panels made of starch foam profiled sections adhere to a transported article.

6. The molded part according to claim 1, wherein the starch foam profiled sections of said panel have a predetermined longitudinal direction.

7. The molded part according to claim 1, which form the multiplex panel and lie on top of one another have different longitudinal directions.

8. The molded part of claim 1, wherein said molded part is present in a packaging material, a protector for transported articles, a construction material, an insulation material for cold, heat sound and shock absorption, a filler for sandwich elements and laminates, an electrostatically non-chargeable protector for the packing of electronic or electric articles, or structural products for the construction, electrical, furniture, automobile or packing industry.

9. A method for preparing molded parts made of completely biodegradable starch foamed material, said method comprising the steps of:

extruding expanded starch foam to form profiled sections; rendering said starch foam profile sections self-adhesive by moisture so as to form moistened starch foam profiled sections; bonding a plurality of said moistened starch foam profiled sections to each other to a form panel, and stacking and bonding a plurality of panels together to form a multiplex panel.

10. The method according to claim 9, wherein the multiplex panel is mechanically or thermally processed to form molded parts.

11. The method according to claim 9, wherein the starch foam profiled sections of each panel have a predetermined longitudinal direction.

12. The method according to claim 11, wherein, when preparing the multiplex panels, the panel with starch foam profiled sections having different longitudinal directions are bonded.

13. The method according to claim 9, wherein said panels are bonded together by the application of moisture.

14. The method according to claim 9, wherein the panels or multiplex panel are cut to predetermined sizes.

15. The method according to claim 9, wherein, when preparing the multiplex panel, the panels are first rotated and then bonded in a stacked state.

16. The method according to claim 9, wherein the multiplex panel are mechanically processed by sawing, milling, cutting, stamping, grinding, trimming or drilling.

\* \* \* \* \*